United States Patent [19]

Harriman

[11] Patent Number: 4,715,255

[45] Date of Patent: Dec. 29, 1987

[54] SAW CARRIAGE STABILIZER

[76] Inventor: Ronald W. Harriman, P.O. Box 258, Troutdale, Oreg. 97060

[21] Appl. No.: 791,166

[22] Filed: Oct. 24, 1985

[51] Int. Cl.⁴ .............................................. B27B 7/02
[52] U.S. Cl. ..................................... 83/471.2; 83/620; 83/821; 83/825; 384/54; 384/57
[58] Field of Search ..................... 83/404.1, 473, 485, 83/486, 471.2, 574, 615, 635, 745, 748, 751, 762, 820–829, 618, 620, 613; 384/54, 57

[56] References Cited

U.S. PATENT DOCUMENTS

| | | | |
|---|---|---|---|
| 2,860,014 | 11/1958 | Short | 83/821 |
| 3,315,554 | 4/1967 | Jaegers | 83/471.2 |
| 3,398,771 | 8/1968 | May | 83/471.2 |
| 3,456,697 | 7/1969 | Rutzebeck | 83/471.2 |
| 3,548,896 | 12/1970 | Larsen | 83/745 |

Primary Examiner—Paul A. Bell
Assistant Examiner—Hien H. Phan
Attorney, Agent, or Firm—Eugene M. Eckelman

[57] ABSTRACT

A longitudinal guide track is arranged to be secured to the elongated supporting frame of a saw mill and a laterally extending arm arranged to be secured to the lower portion of a depending support of a saw carriage has followers arranged for guided movement along the longitudinal guide track for stabilizing the support member and the saw blades. The followers comprise two rollers engageable on opposite sides of the flange. The support for the rollers is spring mounted to provide resilient adjustment to irregularities in the longitudinal flange.

2 Claims, 4 Drawing Figures

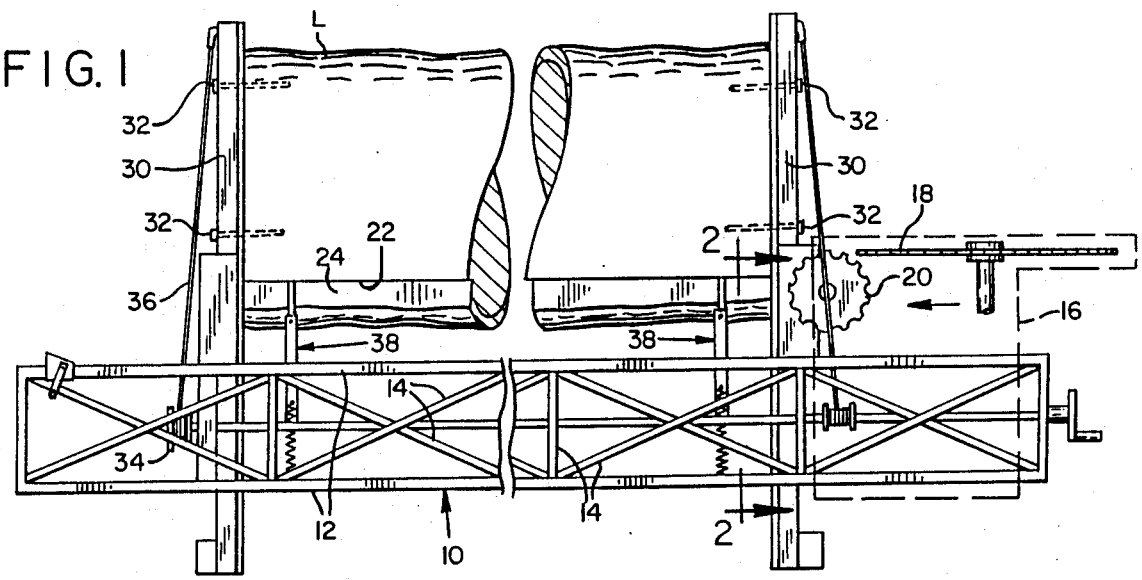
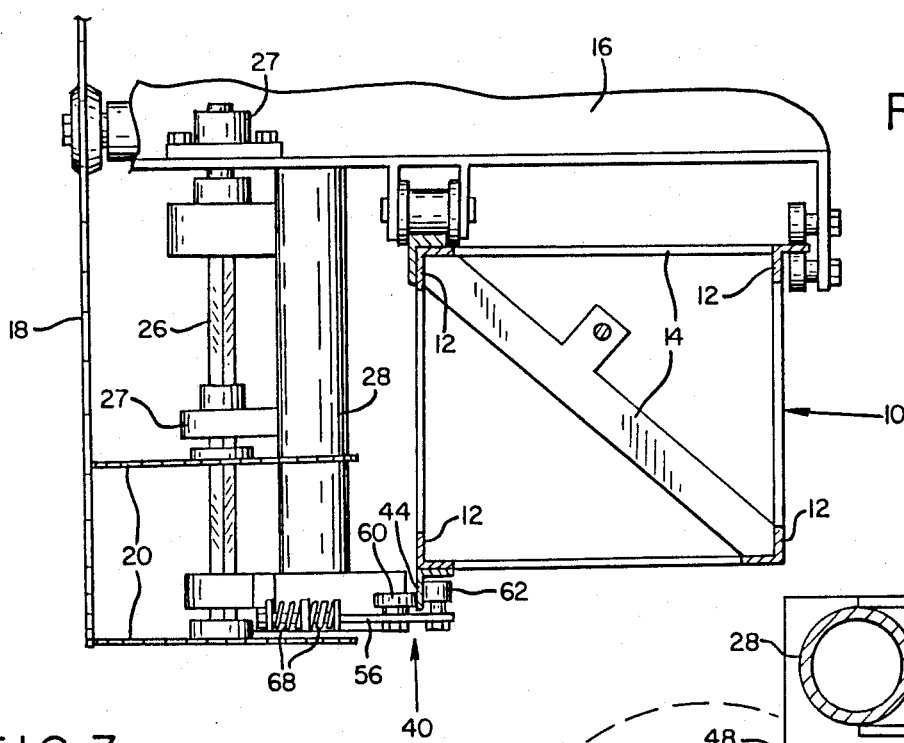
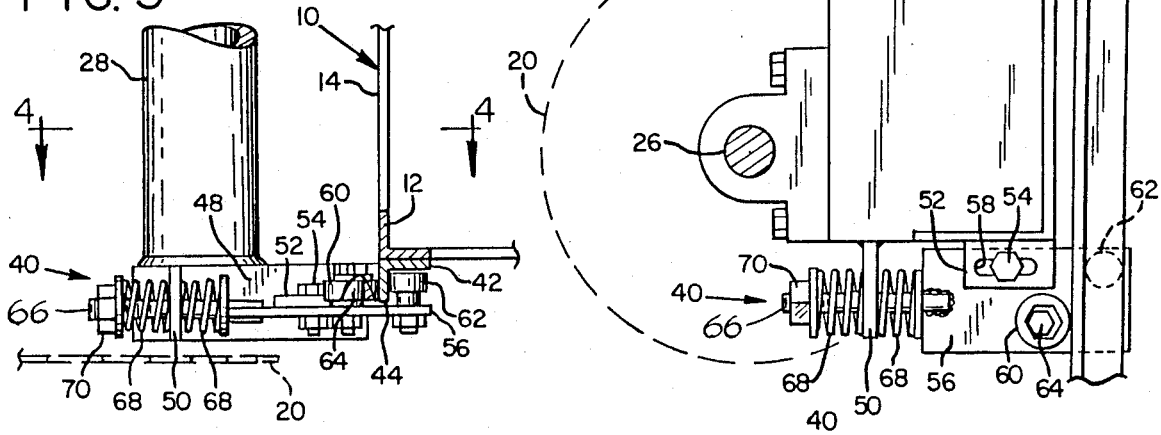

SAW CARRIAGE STABILIZER

BACKGROUND OF THE INVENTION

This invention relates to new and useful improvements in saw carriage stabilizers for saw mills.

Some saw mills currently in use, such as portable mills, employ an elongated frame arranged to be fixed to the ground or fixed to a log and utilize traveling carriages that move along the frame under operator control. In one form of mill, and to which this invention is concerned, a vertical portion of the carriage is supported in depending relation on one side of the longitudinal frame and a vertical saw blade and one or more horizontal blades are disposed in this overhanging portion of the carriage and operate in combination for making saw cuts. The portion of the carriage that supports the horizontal saws comprises a depending structure which is subject to severe strain and vibrations resulting from tension forces developed by the cutting pull from the saw blades, as well as from other forces. Such forces and vibrations result in damage to shafts, bearings, etc. Prior structures have utilized various types of reinforcement means between the carriage body and the depending support for the purpose of stabilizing the saws but such structures have not been successful in overcoming substantially all the vibrations or other undesirable forces.

SUMMARY OF THE INVENTION

According to the present invention and forming a primary objective thereof, a new and improved stabilizing means is provided for eliminating vibrations and other forces in the carriage whereby to provide long life for shafts, bearings, and other parts.

A more particular object is to provide carriage stabilizing means which utilize a direct connection between the bottom end of the depending portion of the carriage and a longitudinal main frame on which the carriage travels, thus utilizing the reinforced strength and rigidity of the main frame to provide stability to the saw blade supporting portion of the carriage.

A further object of the present invention is to provide stabilizing means of the type described which is simplified in structure, which has automatic spring adjustment means for following irregularities in the saw mill frame, and which is readily installed on existing saw mills.

In carrying out the objectives of the invention, a longitudinal guide track in the form of a depending flange is secured to the elongated main supporting frame adjacent the side on which the carriage travels. A laterally extending arm is secured to the lower end of the depending saw support of the carriage and includes follower means which have guided movement along the depending flange on the main frame for stabilizing the saw blades. The follower means comprise followers engageable on opposite sides of the flange for efficient stabilization. Also, the stabilizing means includes compression spring means which provide resilient follower movement along any irregular path of the frame.

The invention will be better understood and additional objects and advantages will become apparent from the following description taken in connection with the accompanying drawings.

BRIEF DESCRIPTION OF THE DRAWINGS

FIG. 1 is a foreshortened plan view of a saw mill and a log being sawed, this type of mill utilizing a structure with which the present invention may be combined;

FIG. 2 is an enlarged cross sectional view taken on the line 2—2 of FIG. 1 and showing details of the present invention;

FIG. 3 is an enlarged sectional view taken similar to FIG. 2; and

FIG. 4 is a fragmentary sectional view taken on the line 4—4 of FIG. 3.

DETAILED DESCRIPTION OF A PREFERRED EMBODIMENT

With reference first to FIGS. 1 and 2, the present invention is shown in conjunction with a portable saw mill wherein the main frame of the saw mill is anchored securely to a log L and successive cuts are made longitudinally of the log by lateral adjustment of a saw carriage support frame. The numeral 10 designates generally a conventional elongated main frame having longitudinal frame members 12 and suitable horizontal, vertical and angled reinforcing members 14. Frame 10 supports a movable carriage 16, shown in phantom lines in FIG. 1 and in full lines but only fragmentarily in FIG. 2. This carriage supports a vertical saw blade 18 and one or more horizontal saw blades 20. Blades 18 and 20 cooperate upon longitudinal movement of the carriage 16 to provide vertical and horizontal cuts 22 and 24, respectively, on the log. The horizontal saw blades 20 are supported on a shaft 26 having journaled support in suitable bearings 27 on the carriage platform and on vertical support 28 depending from the underside of the carriage 16 on one side of the main frame 10.

With reference to FIG. 1, temporary connection between the frame 10 and the log L is accomplished by laterally disposed rail members 30 secured, as by lag screws or spikes 32 or other suitable means, to the log. Winch means 34 with cables 36 secured to the far end of the rail members 30 are used to adjust the frame toward the log after each cut, and stop means 38 position the carriage for each cut. The structure thus far described is conventional and is shown somewhat diagrammatically.

It is apparent from FIG. 2 that with the depending support 28 providing substantially the entire suspension of the horizontal saw blades, and since the saw blades are located adjacent the bottom of this suspended support, vibrations can readily occur in this area, particularly on tough to saw material and on wide cuts of the vertical saw, whereby damage from such vibrations etc. can occur to the shaft 26, bearings 27, and other parts.

According to the present invention, the bottom of the depending support 28 is provided with stabilizing means 40 which utilize the rigidity of the elongated main frame 10 as a guiding support for the lower end of the carriage as it moves in making a cut. With reference to FIGS. 2, 3 and 4, a guide track 42 is secured longitudinally to the bottom of the frame 10 on the side next to the depending support 28. This guide track has a full length depending flange 44. Secured horizontally to the bottom end of the support 28, as by welding, is a rigid frame or arm 48 having a projecting ear 50 adjacent an outer end thereof and an integral rigid tab or extension 52 projecting in the same direction as the ear 50. The tab 52 supports, by means of an upright shoulder bolt 54, a laterally extending slide plate 56. The tab 52 has a slot 58 therein through which the shoulder bolt 54 extends whereby the slide plate 56 can have a slight amount of lateral adjustment relative to its mounted support on the frame 48, as will be more apparent hereinafter. Slide plate 56 carries a pair of rollers 60 and 62, such rollers being spaced from each other and disposed on opposite sides of the depending flange 44 of the guide track 42. As will be apparent, these two rollers track along the flange 44 and stabilize the lower end of the support 28. One of the rollers 60 or 62, such as the roller 60, is provided with a cam-shaped bearing support 64 for adjustment to the flange 44 during installation.

The outer end of the slide plate 56 has an integral shaft extension 66 which supports a pair of heavy duty compression springs 68 one on each side of the ear 50. One spring 68 is engageable between the ear 50 and a head portion 70 of the shaft 66 and the other spring 68 is engageable between the ear 50 and the slide plate 56. These springs, while holding the slide plate 56 substantially firmly in place, allow the slide plate to adjust slightly in a lateral direction as the carriage moves in its operation now to become apparent.

According to the present invention, the bottom end of the depending support 28 is firmly reinforced against vibration or other undesirable forces by reason of the reinforcement received from the strong main frame 10. That is, as the carriage moves, the rollers 60 and 62 are in firm engagement on opposite sides of the flange 44 and prevent undesirable forces or vibrations from developing in the support 28 and the horizontal saws 20. Springs 68, however, allow the rollers and the slide plate 56 to adjust laterally to any irregularity in the flange 44. With the lower end of the carriage support and the saw blades stabilized by the main frame of the saw mill, the life of the bearings and other parts are prolonged. Also, with the saw blades stabilized, they make a smooth narrow cut, thus allowing the carriage to travel fast and/or with less power.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A portable saw mill comprising:
an elongated supporting frame,
a carriage movable longitudinally on said frame and having a vertical saw blade at one side thereof,
a depending support on said carriage supporting at least one horizontal saw blade cooperating with the vertical saw blade in sawing boards from a log,
a longitudinal depending guide flange secured to the elongated supporting frame,
a laterally extending bracket secured to a lower portion of the said depending support,
a slide plate slidably mounted on said bracket in a lateral direction,
a pair of rollers mounted on said slide plate engageable on opposite sides of said flange and having guided following movement along said longitudinal guide flange for stabilizing the lower portion of said depending support and the horizontal saw blade thereon in a lateral direction,
abutment means on at least one of said bracket and slide plate,
and compression spring means on both sides of said abutment means engageable with at least one of said bracket and slide plate and providing resilient adjustment of at least one of said bracket and slide plate to adjust to lateral irregularities in said flange.

2. A portable saw mill comprising:
an elongated supporting frame,
a carriage movable longitudinally on said frame and having a vertical saw blade at one side thereof,
a depending support on said carriage supporting at least one horizontal saw blade cooperating with the vertical saw blade in the sawing boards from a log,
a longitudinal guide track secured to the elongated supporting frame and having an elongated depending flange,
a bracket secured to said depending support,
a slide plate slidably mounted on said bracket in the lateral direction,
a pair of rollers on said slide plate engageable with opposite sides of said flange,
abutment means on said bracket,
and compression spring means engageable on both sides of said abutment means and providing resilient adjustment of said slide plate to adjust to lateral irregularities in said flange as said rollers follow said flange.

* * * * *